United States Patent [19]

Liedenbaum et al.

[11] Patent Number: 5,691,832
[45] Date of Patent: Nov. 25, 1997

[54] COHERENCE MULTIPLEXED TRANSMISSION SYSTEM

[75] Inventors: Coen T.H.F. Liedenbaum; John J.E. Reid, both of Eindhoven, Netherlands

[73] Assignee: U.S. Philips Corporation, New York, N.Y.

[21] Appl. No.: 283,448

[22] Filed: Aug. 1, 1994

[30] Foreign Application Priority Data

Aug. 2, 1993 [BE] Belgium ............... 09300803

[51] Int. Cl.$^6$ .......................... H04J 14/00; G02F 2/00
[52] U.S. Cl. .......................... 359/115; 359/181; 375/219; 375/295; 370/537
[58] Field of Search .......................... 372/26; 385/2, 385/3, 14; 359/115, 123, 124, 140, 157, 181, 238, 246; 370/58.1, 77, 19, 50, 70, 122, 123, 203, 294, 295; 375/295

[56] References Cited

U.S. PATENT DOCUMENTS

| | | | |
|---|---|---|---|
| 4,860,279 | 8/1989 | Falk et al. | 370/1 |
| 4,882,775 | 11/1989 | Coleman | 455/617 |
| 4,956,834 | 9/1990 | Coleman. | |
| 5,200,964 | 4/1993 | Huber. | |
| 5,416,628 | 5/1995 | Betti et al. | 359/181 |
| 5,453,865 | 9/1995 | Faulkner et al. | 359/110 |

FOREIGN PATENT DOCUMENTS 0503579  9/1992  European Pat. Off. .

OTHER PUBLICATIONS

"Analysis of Optical Crosstalk in Coherence Multiplexed Systems Employing a Short Coherence Laser Diode with Arbitrary Power Spectrum", by Goedgebuer et al, IEEE Journ. of Quantum Elec., vol. 26, No. 7, Jul. '90, pp. 1217–1226.

*Primary Examiner*—Wellington Chin
*Assistant Examiner*—Jean B. Corrielus
*Attorney, Agent, or Firm*—Leroy Eason

[57] ABSTRACT

In a transmitter in a coherence multiplexed transmission system the output signal of a laser is directly applied to a channel and indirectly via a plurality of cascaded circuits of delay elements and modulators. The modulators vary a component of the autocorrelation function of the output signal of the transmitter as a function of an associated modulation signal ($m_1$, $m_2$, $m_3$). In the receiver the autocorrelation functions values of the channel output signal for delays ($D_1$, $D_2$, $D_3$) are determined in the demodulators. These autocorrelation function values from the modulated signal ($m_1'$, $m_2'$, $m_3'$). To reduce the number of periodic components of the autocorrelation function of the signal source, and hence enhance the possible transmission capacity, the transmitter comprises a decorrelation modulator for modulating the signal source with pulses generated by a pulse generator.

12 Claims, 3 Drawing Sheets

COHERENCE MULTIPLEXED TRANSMISSION SYSTEM

BACKGROUND OF THE INVENTION

1. Field of the Invention

The invention relates to a multiplex transmission system comprising a transmitter which includes a signal source coupled to a first and a second modulator for respectively modulating a first and a second autocorrelation function value of an output signal on an output of the transmitter in response to a first and a second modulation signal respectively. The output of the transmitter is coupled via a channel to an input of a receiver, the receiver comprising correlation means for determining the modulation in at least one autocorrelation function value.

The invention likewise relates to a transmitter to be used in such a transmission system.

2. Description of the Related Art

A transmission system as defined in the opening paragraph is known from the published article entitled: "Analysis of Optical Crosstalk in Coherence Multiplexed Systems Employing a Short Coherence Laser Diode with Arbitrary Power Spectrum", by J. P. Goedgebuer et al. in IEEE Journal of Quantum Electronics, Vol. 26, No. 7, July 1990.

In multiplex transmission systems it is desired to send several signals over a single transmission channel. For this purpose, the, transmit signals are to be combined into a single signal in one way or another. Various techniques to this end are known, such as time-division multiplexing and frequency-division multiplexing.

In time-division multiplexing, samples of the different transmit signals or dam symbols of the different transmit signals are alternately applied to the channel. In this respect it is then necessary that the rate at which the combined signal is applied to the channel be at least equal to the sum of the rates at which the individual signals are applied to the transmitter.

When a large number of different signals are to be combined into a single time-division multiplex signal, a high processing rate is then required from the necessary electronic components, which leads to a substantial cost price of the system.

When frequency-division multiplex is used, each signal to be transmitted is individually modulated on its own carrier. A sum signal obtained by adding together all the carriers to a combined signal, is then transmitted over the channel. The receiver then needs to comprise filters to recover the separate modulated carriers from the combined signal. When there are a large number of signals, a large number of often complex filters are necessary.

In the transmission system known from said journal article, the autocorrelation function of a signal supplied by a signal source is modulated by a modulator in response to the modulation signals. For each of the modulation signals the autocorrelation function value of the transmitter output signal is modulated thereby for a delay belonging to that specific modulation signal.

The correlation means in the receiver separates the different modulation signals by determining the autocorrelation function of the received signal for a delay period belonging to the appropriate modulation signal concerned.

The modulator in the transmitter is generally arranged as an element which adds a delayed fraction of the signal source output signal, delayed over a period of time belonging to the modulation signal, to the transmitter output signal in response to the modulation signal concerned.

Although the signal received at the input of the receiver strongly depends on the channel properties, the autocorrelation function of that input signal proves to change only slightly. As the channel properties now barely have a further effect on that function of the received signal, high transmission rates are possible. In TDM and FDM systems the transmission capacity is restricted by the channel properties.

In the transmission system known from said journal article, the delays used must satisfy a number of requirements in order to avoid cross talk between various modulation signals. This cross talk arises from the fact that the autocorrelation function of the signal source output signal has periodic components. This occurs, for example, in optical transmission systems in which a Fabry-Perot laser is used which generates a spectrum constituted by a number of equidistant discrete components. These requirements, which are imposed by the periodicity in the autocorrelation function of the signal source, lead to a restriction of the number of usable values of the delay in the modulators.

Another restriction of the transmission capacity may arise from the fact that the autocorrelation function of the signal source output signal shows a wide peak for a near zero delay value. This is found, for example, in optical transmission systems in which a DFB (Distributed FeedBack) laser is used which generates only a single spectral component. Due to the large width of the autocorrelation pulse around the zero value, the difference between the various delays in the various modulators must always be large to avoid cross talk. This again leads to another restriction of the attainable transmission capacity.

SUMMARY OF THE INVENTION

It is an object of the invention to provide a transmission system as defined in the opening paragraph, in which said restrictions of the transmission capacity are eliminated.

For this purpose, the invention is characterized in that the transmitter comprises a decorrelation modulator for modulating the signal source output signal so as to reduce the autocorrelation function of the signal source output signal for non-zero delays.

By modulating the signal source by means of the decorrelation modulator, an autocorrelation function having a number of equidistant components is altered to such extent that the equidistant components for non-zero delays are attenuated considerably. In a signal source showing a wide autocorrelation peak around zero, the coherence between the signal source output signal is altered at different instants, so that the autocorrelation peak around zero will become narrower. In both situations the transmission capacity of the transmission system is increased considerably. The decorrelation modulator can be arranged as a separate modulator which drives the signal source, but it is alternatively conceivable that the decorrelation modulator is integrated in the signal source. This integration takes place, for example, in an autopulsating laser which generates a light signal formed by successive light pulses. A laser of this type is known, for example, from British Patent specification GB 2221 094 A.

It is observed that from U.S. Pat. No. 4,882,775 a transmission system is known which utilizes coherence multiplexing in which the signal source is modulated. In this transmission system the signal source is modulated in response to the modulation signal, however. However, an additional decorrelation modulator is not provided in the transmission system, so that the problem solved by the present invention is still present in the transmission system known from said U.S. Patent.

An embodiment of the invention is characterized in that the decorrelation modulator comprises an amplitude modulator.

Amplitude modulation can easily be effected in most signal sources, so that the complexity of the transmission system is hardly enhanced by the addition of the decorrelation modulator.

A further embodiment of the invention is characterized in that the transmitter comprises a pulse generator coupled to a modulation input of the decorrelation modulator.

The use of a pulse generator is advantageous in that a large number of digital signals can be multiplexed, while each of the bit streams applied to the modulators only needs to have a bit rate equal to the pulse rate. This means that a high transmission rate of the whole transmission system can be attained without the need for generating signals having a very high frequency. The operation of the pulse generator can be approximated by a signal source having a more or less sine-shaped output signal, the signal source being switched off during the negative period and is switched on during the positive period.

BRIEF DESCRIPTION OF THE DRAWINGS

The invention will be further explained with reference to the drawings Figures, in which.

DESCRIPTION OF THE PREFERRED EMBODIMENTS

Figure 1:
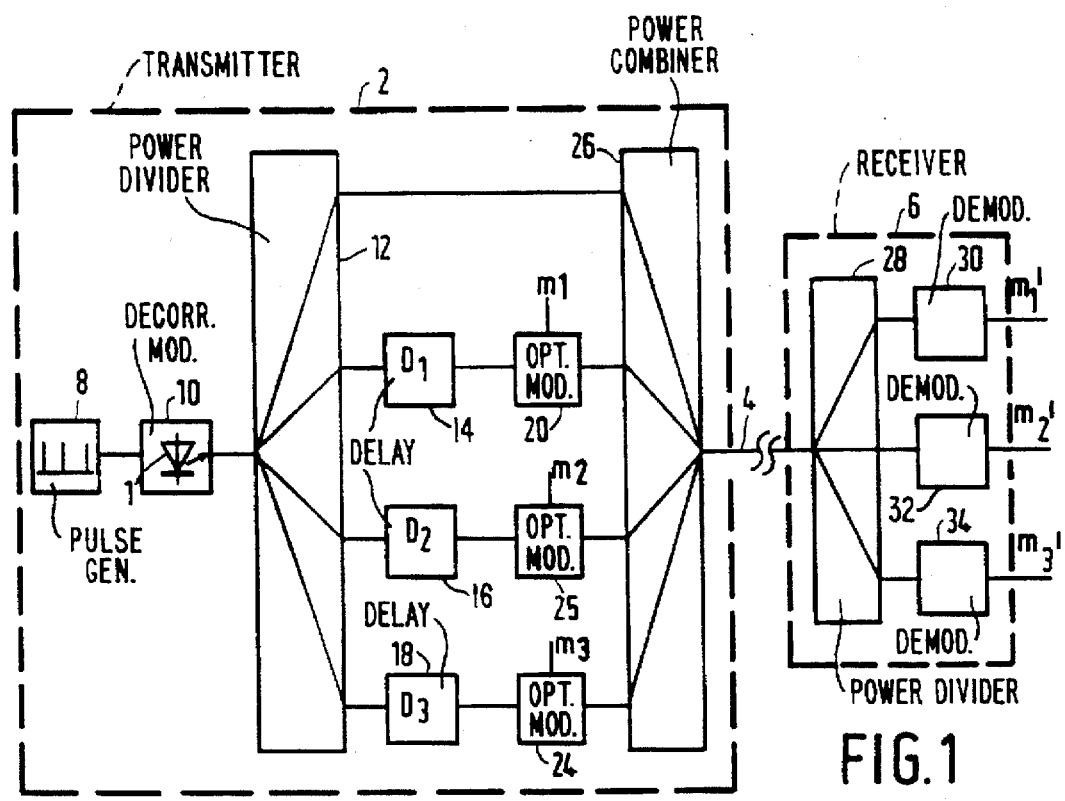
FIG. 1 shows a transmission system according to the invention.

In the transmission system shown in FIG. 1 a transmitter 2 is coupled to a receiver 6 by a channel in this case formed by a glass fibre. In the transmitter 2 the output of a pulse generator 8 is coupled to an input of a decorrelation modulator 10, which is arranged for modulating a signal source, in this case formed by a semiconductor laser 1. The optical output of the semiconductor laser 1 is connected to an input of a power divider 12. A first output of the power divider 12 is connected to a first input of a power combiner 26. A second output of the power divider 12 is connected to an optical delay element 14. The output of the optical delay element 14 is connected to an input of an optical modulator 20, while the output of the optical modulator 20 is connected to a second input of the power combiner 26. A modulation signal $m_1$ is applied to a modulation input of the optical modulator 20. A third output of the power divider 12 is connected to a third input of the power combiner 26 via an optical delay element 16 having an optical delay $D_2$, and a modulator 27. A modulation signal $m_2$ is applied to a modulation input of the modulator 25. A fourth output of the power divider 12 is connected to a fourth input of the power combiner 26 via an optical delay element 18 and an optical modulator 24. A modulation input of the modulator 24 is supplied with a modulation signal $m_3$.

The output of the power combiner 26, likewise forming the output of the transmitter, is connected to a receiver 6 by a channel in this case being a glass fibre 4. The input of the receiver is connected to an input of a power divider 28. Each of the outputs of the power divider 28 is connected to an input of a demodulator 30, 32 and 34. On the output of the demodulator 30, 32 and 34 are available the demodulated signals $m_1'$, $m_2'$ and $m_3'$.

In the transmission system shown in FIG. 1 the semiconductor laser 1 is switched on and off in a pulsed manner by the decorrelation modulator 10 in the transmitter 2 in response to the output signal of pulse generator 8. The power divider 12 splits the light generated by the semiconductor laser 1 into four parts which may be equal, but may also be different. Three of the output signals are delayed by their own delay elements i.e. 14, 16 and 18, over a period of time equal to $D_1$, $D_2$ and $D_3$, respectively. These delayed signals are amplitude or phase modulated by modulators 20, 25 and 24 by their individual modulation signals i.e. $m_1$, $m_2$ and $m_3$. The modulated signals and a non-modulated signal are combined into a single output signal by the power combiner 26. This output signal has an autocorrelation function which shows peaks for delays of, for example, zero, $D_1$, $D_2$ and $D_3$. The height of the peaks for delays $D_1$, $D_2$ and $D_3$ is determined by the respective modulation signals $m_1$, $m_2$ and $m_3$. When the amplitude of the signal source output signal is modulated in response to binary digital signals, the various autocorrelation peaks are switched on and off by the modulation signals. When the phase of the signal source output signal is modulated in response to binary digital signals, the positions of the various autocorrelation peaks are varied between two values by the modulation signals.

The combined signal is transferred to the receiver over the glass fibre 4. The transferred pulses will become wider as a result of the dispersion, but the autocorrelation functions will remain substantially the same. In the receiver 6 the received signal is split into three parts by the power divider 28. Each of these parts is demodulated by its own demodulator. The demodulators 30, 32 and 34 determine the autocorrelation function of their input signals for delays equal to $D_1$, $D_2$ and $D_3$, respectively. The signals $m_1'$, $m_2'$ and $m_3'$ are available on the outputs of the demodulators 30, 32 and 34.

If the semiconductor laser 1 used generates a light signal having a $\Delta f$ bandwidth, the peak of the autocorrelation function for a zero delay has a width of about $1/\Delta f$. Assuming that $c=\lambda f$, where c is the velocity of light, $\Delta \lambda$ can be expressed in $\Delta f$:

$$\Delta\lambda = \Delta f \lambda^2 / C \tag{1}$$

For the pulse widening $\Delta\tau$ due to dispersion holds:

$$\Delta\tau = \Delta\lambda \cdot D \cdot L = \frac{\Delta f \cdot \lambda^2 \cdot D \cdot L}{C} \tag{2}$$

In (2) D is the dispersion of the glass fibre expressed in s/m² and L is the length of the glass fibre. There is no cross talk as long as the pulse width at the output of the glass fibre is smaller than the period of the pulses. For the maximum value of the repetition rate $f_r$ of the pulse source it then holds: $f_r = 1/\Delta\tau$. The minimum value of the difference between two delays is to exceed the width of the peaks of the autocorrelation function of the laser output signal. The following can then be written by approximation for the permissible minimum value of this difference:

$$\Delta t = 2/\Delta f \quad (3)$$

The number of modulation signals N that can be accommodated in the system without this leading to cross talk is then equal to:

$$N = \Delta \tau / \Delta t \quad (4)$$

For the total transmission capacity it then holds:

$$B = f_{rep} \cdot N = \frac{1}{\Delta \tau} \cdot \frac{\Delta \tau}{\Delta t} = \frac{1}{\Delta t} \quad (5)$$

Thus the transmission capacity proves to be immune to the properties of the glass fibre. The number of delay elements N needed is then equal to $\Delta \tau.B$. This is taken to mean that the complexity of the transmission system enhances with the total dispersion of the glass fibre and with the transmission capacity.

Figure 2:
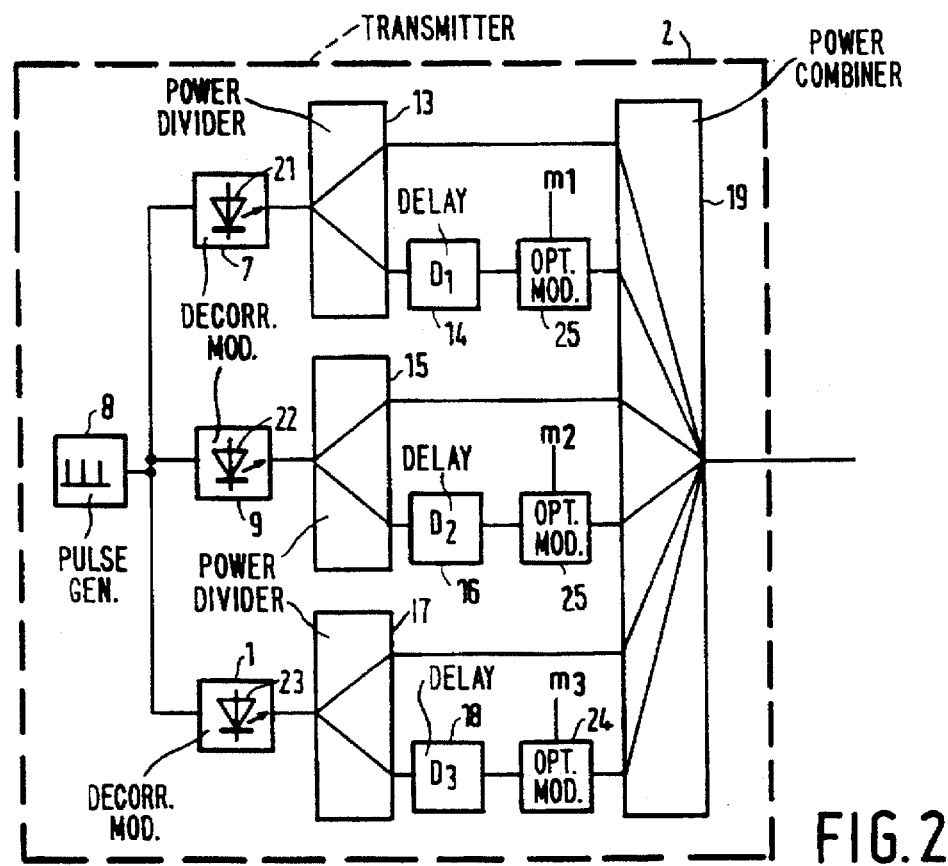
FIG. 2 shows a first alternative embodiment for the transmitter to be used in a transmission system as shown in FIG. 1.

In the transmitter 2 shown in FIG. 2 the output of a pulse generator 8 is connected to an input of each of decorrelation modulators 7, 9 and 11, which are arranged for modulating signal sources, here formed by semiconductor lasers 21, 22 and 23.

The output of the semiconductor laser 21 is connected to an input of a power divider 13. A first output of the power divider 13 is connected to a first input of a power combiner 19, while a second output of the power divider 13 is connected to a second input of the power combiner 19 via an optical delay element 14 and an optical modulator 20.

The output of the semiconductor laser 22 is connected to an input of a power divider 15. A first output of the power divider 15 is connected to a third input of the power combiner 19, while a second output of the power divider 15 is connected to a fourth input of the power combiner 19 via an optical delay element 16 and an optical modulator 25. The output of the semiconductor laser 23 is connected to a first input of a power divider 17. A first output of the power divider 17 is connected to a fifth input of the power combiner 19, while a second output of the power divider 17 is connected to a sixth input of the power combiner 19 via an optical delay element 18 and an optical modulator 24.

The output of the transmitter 2 is formed by the output of the power combiner 19.

In the transmitter shown in FIG. 2 three signal sources are used instead of one. These signal sources are amplitude modulated by the decorrelation modulators 7, 9 and 11 in response to the output signal of the pulse generator 8. Needless to observe that it is conceivable that each decorrelation modulator is driven by a separate pulse generator. The autocorrelation function of the output signal of transmitter 2, for delays $D_1$, $D_2$ and $D_3$, is modulated by the modulators 20, 25 and 24 in similar fashion to the transmitter shown in FIG. 1.

The advantage of the use of more signal sources is that it will be sufficient to have signal sources which have a relatively small output power, because this output power needs to be sufficient for only a single modulation signal. With a large N, the signal source in the transmitter shown in FIG. 1 will have to produce a considerable power that is N times larger than the power of one of the semiconductors 21, 22 or 23.

Figure 3:
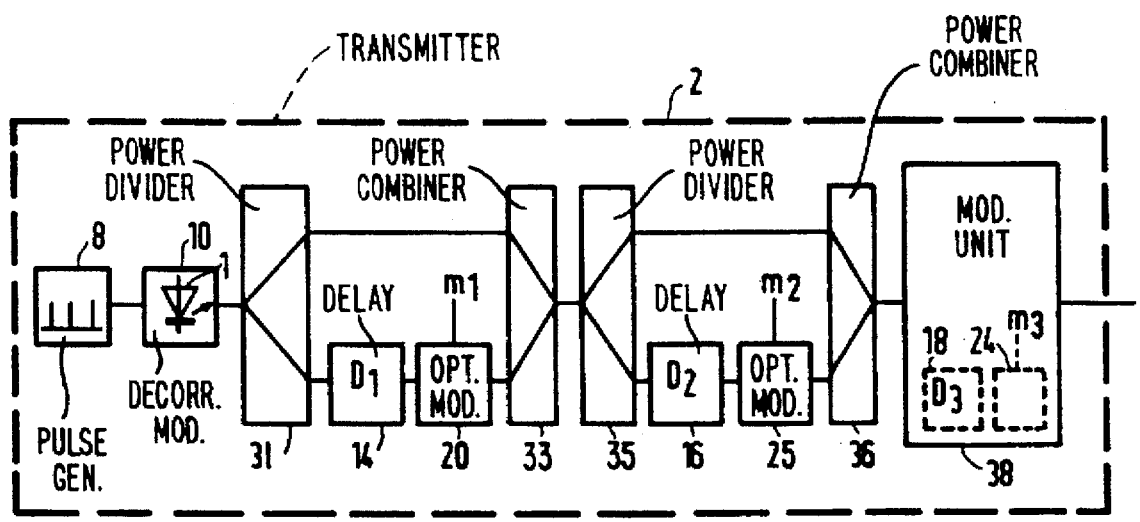
FIG. 3 shows a second alternative embodiment for the transmitter to be used in a transmission system as shown in FIG. 1.

In the transmitter 2 shown in FIG. 3 the output of a pulse generator 8 is connected to an input of a decorrelation modulator 10 for modulating a semiconductor laser 1. The output of the semiconductor laser 1 is connected to an input of a power divider 30. A first output of the power divider 31 is connected to a first input of a power combiner 33. A second output of the power divider 31 is connected to a second input of the power combiner 33 via an optical delay element 14 and an optical modulator 20.

An output of the power combiner 33 is connected to an input of a power divider 35. A first output of the power divider 35 is connected to a first input of a power combiner 36. A second output of the power divider 35 is connected to a second input of the power combiner 36 via an optical delay element 16 and an optical modulator 25.

Between the output of the power combiner 36 and the output of the transmitter is included a modulation unit 38 which is structured similarly to the modulation units comprising a power combiner, a delay element, an optical modulator and a power combiner.

In the transmitter shown in FIG. 3 the modulation units are cascaded, contrary to the transmitter shown in FIG. 1, in which the modulation units are connected in parallel. In the transmitter shown in FIG. 3 the use of power dividers having two outputs and power combiners having two inputs may suffice, whereas power dividers/combiners having larger numbers of inputs/outputs are necessary in the transmitter shown in FIG. 1.

A disadvantage of the transmitter shown in FIG. 3 is the introduction of components into the autocorrelation function of the transmitter output signal for delays $D_1+D_2$, $D_1+D_3$, $D_2+D_3$ and $D_1+D_2+D_3$. These components cause cross talk to occur if the system uses delay elements for other modulation signals having one of these delays.

It is noted that the modulators in the transmitters can be arranged not only as amplitude modulators, but also as phase modulators modulating the position of the autocorrelation peak as a function of the modulation signal.

Figure 4:
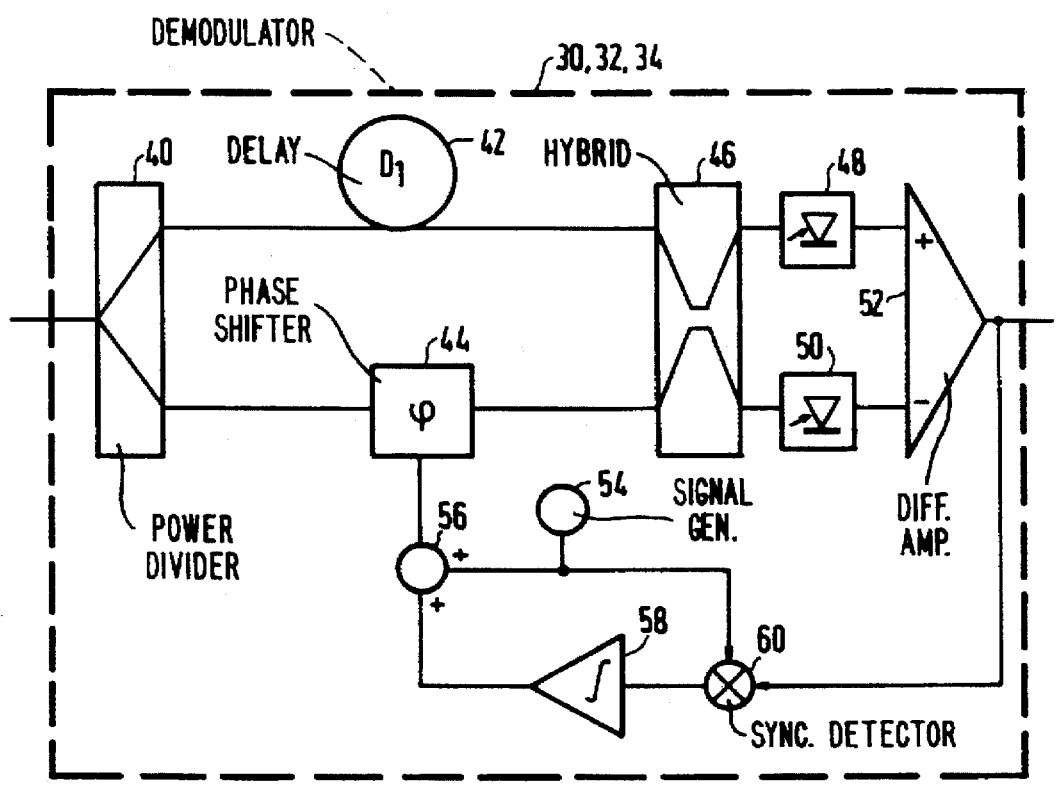
FIG. 4 shows a receiver to be used in a transmission system according to the invention.

The demodulators 30, 32, 34 shown in FIG. 1 are shown in more detail in FIG. 4, in which the signal to be demodulated is applied to an input of a power divider 40. A first output of the power divider 40 is connected to a first input of a 180° hybrid 46 via a delay element 42 comprising a piece of glass fibre having a defined length. A second output of the power divider 40 is connected to a second input of the 180° hybrid 46 via a phase shifter 44. A first output of the 180° hybrid 46 is connected to a photo diode 48 and a second output of the 180° hybrid 46 is connected to a photo diode 50. The output of the photo diode 48 is connected to a positive input of a differential amplifier 52, the output of the photo diode 50 being connected to a negative input of the differential amplifier 52. The output of the differential amplifier 52, likewise forming the output of the demodulator, is connected to a first input of a synchronous detector 60. An output of an auxiliary signal generator 54 is connected to a second input of the synchronous detector 60 and to a first input of an adder circuit 56. The output of the synchronous detector 60 is connected to an input of an integrator 58. The output of the integrator 58 is connected to a second input of the adder circuit 56. The output of the adder circuit 56 is connected to a control input of the phase shifter 44.

For explanation of the operation of the demodulator in FIG. 4 the received signal is assumed to comprise a series of main pulses having a repetition rate of $f_r$, and a series of signal-carrying pulses whose amplitude or exact position is determined by a modulation signal, the signal carrying the latter pulses being delayed by $D_1$ seconds relative to the main pulses. In addition, it is assumed that the delay difference in the two branches between the power divider 40 and the 180° hybrid is a multiple of the period belonging to the optical frequency ($c/\lambda$) of the light signal.

In the power divider 40 the incoming signal is split into two components. One of these components is subjected to a delay $D_1$ in the delay element 42. If this delay period is equal to the time difference between a main pulse and a signal-carrying pulse, the main pulse on the output of the delay element 42 will coincide with the signal-carrying pulse on the output of the phase shifter 44. The output signal on the first output of the 180° hybrid is equal to the sum of the two input signals of the 180° hybrid, and the output signal on the second output of the 180° hybrid is equal to the difference between the two input signals of the hybrid. As the delayed pulse of the first input of the 180° hybrid 46 and the main pulse on the second input of the 180° hybrid 46 coincide, constructive interference will cause a pulse to occur having a twice higher amplitude than on the first output of the 180° hybrid 46, whereas destructive interference will cause the absence of a signal on the second output of the 180° hybrid. The main pulse of the output signal of the phase shifter 44 will lead to two equally large pulses on the two outputs of the 180° hybrid 46. The same will hold for the delayed (signal carrying) pulse on the output of the delay element 42. On the output of the amplifier 52 a pulse will then only be available if the optical input signals on the inputs of the two photo diodes 48 and 50 are different. This is only the case when a main pulse of one branch coincides with a signal dash carrying pulse of the other branch.

In similar manner, amplitude modulation of the signal dash carrying pulses can be demodulated.

In the case of phase modulation (for example, 0 and 180° PSK) the desired signal will be available only on the first output of the 180° hybrid 46 during the 0° period, whereas during a 180° period the desired signal will be available only on the second output of the hybrid. This results in the fact that the sign of the output signal of the amplifier 52 is determined by the phase of the modulated signal.

If the difference between the delay $D_1$ and the delay between a main pulse and a signal dash carrying pulse is larger than the coherence time, no interference effects will occur and the two output signals will be the same. This means that the output signal of the amplifier 52 will be equal to 0.

To provide that the delay difference between the two branches of the demodulator is exactly a multiple of the period belonging to the frequency of the light, there is a control system available formed by synchronous detector 60, integrator 58, adder circuit 56, auxiliary signal generator 54 and phase rotation circuit 44.

Via the adder circuit 56 the phase rotation circuit 44 is supplied with an auxiliary signal generated by the auxiliary signal generator 54. This causes the phase difference between the output signals of the delay element 42 and the output of the phase rotation circuit 44 to vary.

If the average phase difference between the output signals of the branches of the demodulator are equal to 0 (or $\pi$), the amplitude of the output signal of the differential amplifier is maximized. Since the output signal of the differential amplifier 52 presents an even symmetry around $\phi=0$ (and $\pi$) as a function of the phase shift $\phi$ of the phase shifter 44, the variations of the phase difference will not lead to an auxiliary-signal-dependent signal component on the output of the differential amplifier 52.

If the average phase difference differs from 0 (or $\pi$), however, the variations of the phase difference do result in an auxiliary-signal-dependent signal component in the output signal of the differential amplifier 52.

By detecting the presence of the auxiliary-signal-dependent signal component in the output signal of the differential amplifier 52 with the aid of the synchronous detector 60, an error signal is obtained which is a measure for the deviation from the average phase difference between the output signals of the two branches of the demodulator. This error signal is integrated by the integrator 58. The output signal of the integrator 58 is applied, via the adder circuit, to the phase shifter to correct the average phase difference.

Figure 5:
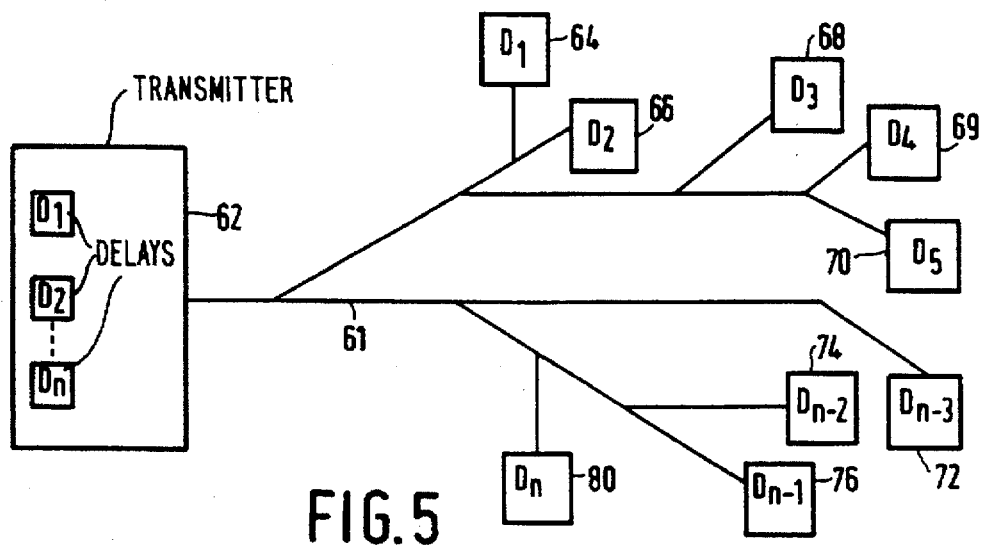
FIG. 5 shows a passive optical distribution network implementing the invention.

In the transmission system shown in FIG. 5 a transmitter 62 is connected to a plurality of telephone connections 64 . . . 80 via a passive optical network. This passive optical network is partly a common network to a plurality of subscribers. Therefore, it is necessary that the receivers in the subscriber connections extract from the complete signal the signal intended for the subscriber concerned. For this purpose, the signals intended for the different subscribers are combined in the transmitter 62 by coherence multiplexing with different delays $D_1, \ldots, D_n$ to form a single output signal. Each of the subscriber receivers comprises a demodulator which has its own delay which, within the coherence time, is equal to one of the values $D_1$–$D_n$. As the demodulators of different subscribers are set to different values, each subscriber receives the signal intended for that subscriber.

Figure 6:
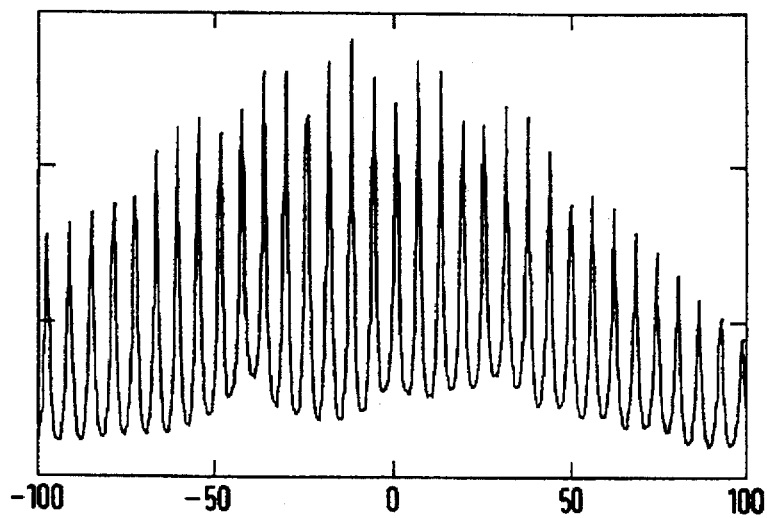
FIG. 6 shows an autocorrelation function of the output signal of a Fabry-Perot laser as this is used in a state-of-the-art transmission system.

In FIG. 6 the autocorrelation function is shown of the output signal of a Fabry-Perot laser of the CQF56 type supplied by Philips Semiconductors. The laser is then continuously switched on as in the state-of-the-art transmission system. FIG. 6 distinctly shows that the autocorrelation function has a large number of components due to which the use of such a signal source leads to a considerable limitation of the transmission capacity.

Figure 7:
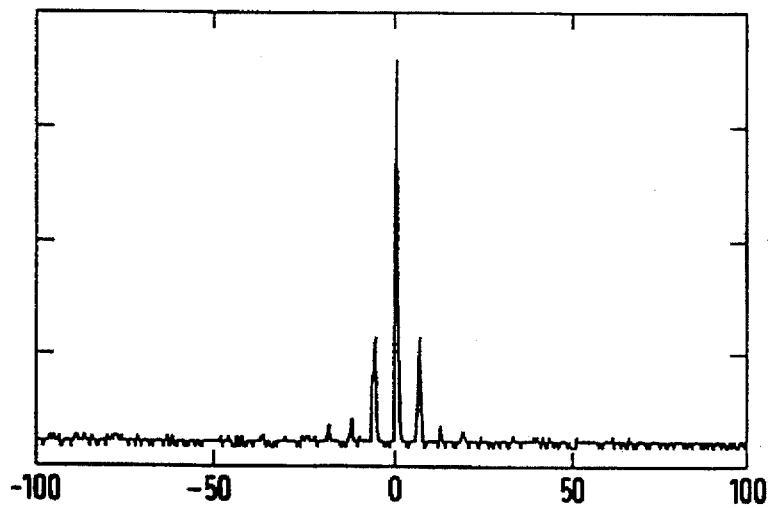
FIG. 7 shown an autocorrelation function of the output signal of a Fabry-Perot laser used in a transmission system according to the invention.

FIG. 7 shows the autocorrelation of a CQF56 laser used in a transmission system according to the invention. The laser is pulse modulated (switched on and off) with the measurement of the autocorrelation function, which pulses have a 919 MHz frequency. The pulses are approximated here by a sine-shaped signal. The quiescent current flowing through the laser was here 3mA. FIG. 7 distinctly shows that the number of periodic components of the autocorrelation function are reduced considerably relative to the autocorrelation function shown in FIG. 6. As a result, smaller values of the delays $D_1, \ldots, D_n$ can be used, so that a higher transmission capacity can be achieved.

We claim:

1. A multiplex digital transmission system comprising:
   a transmitter which includes
      signal generating means producing at least first and second digital signals having respective autocorrelation function values corresponding to respective non-zero delays;
      a first and a second modulator coupled to said signal generating means for respectively modulating the autocorrelation function values of said first and second digital signals in accordance with first and second modulation signals respectively supplied to said first and second modulators; and
      means for combining the modulated first and second digital signals to form a transmit signal at an output of said transmitter;
   a transmission channel coupled to the output of said transmitter for conveying said transmit signal; and
   a receiver coupled to said transmission channel to receive the transmit signal therefrom and comprising first and second demodulators respectively responsive to the autocorrelation function values of the modulated first and second digital signals to recover said first and second modulation signals;

characterized in that said signal generating means comprises a carrier wave generator and a decorrelation modulator coupled thereto, said first and second digital signals being derived from a carrier wave produced by said generators, said carrier wave having an autocorrelation function which includes periodic components; said decorrelation modulator modulating said carrier wave so as to reduce the number of said periodic components of said autocorrelation function thereof, thereby enhancing the transmission capacity of said transmission system.

2. The system as claimed in claim 1, wherein the decorrelation modulator comprises an amplitude modulator.

3. The system as claimed in claim 2, wherein the signal generating means comprises an electrooptical converter.

4. The system as claimed in claim 1, wherein said signal generating means comprises a pulse generator coupled to a modulation input of the decorrelation modulator.

5. The system as claimed in claim 4, wherein the signal generating means comprises an electrooptical converter.

6. The system as claimed in claim 1, wherein the decorrelation modulator comprises a frequency modulator.

7. The system as claimed in claim 6, wherein the signal generating means comprises an electrooptical converter.

8. The system as claimed in claim 1, wherein the signal generating means comprises an electrooptical converter.

9. A multiplex digital transmitter comprising:

signal generating means producing at least first and second digital signals having respective autocorrelation function values corresponding to respective non-zero delays;

a first and a second modulator coupled to said signal generating means for respectively modulating the autocorrelation function values of the first and second digital signals in accordance with first and second modulation signals respectively supplied to said first and second modulators; and means for combining the modulated first and second digital signals to form a transmit signal at an output of said transmitter;

characterized in that said signal generating means comprises a carrier wave generator and a decorrelation modulator coupled thereto, said first and second digital signals being derived from a carrier wave produced by said generator, said carrier wave having an autocorrelation function which includes periodic components; said decorrelation modulator modulating said carrier wave so as to reduce the number of said periodic components of said autocorrelation function thereof, thereby enhancing the transmission capacity of said transmitter.

10. The transmitter as claimed in claim 9, wherein the decorrelation modulator comprises an amplitude modulator.

11. The transmitter as claimed in claim 10, wherein said signal generating means comprises a pulse generator coupled to a modulation input of the decorrelation modulator.

12. The transmitter as claimed in claim 9, wherein said signal generating means comprises a frequency modulator.

* * * * *